(12) United States Patent
Anand

(10) Patent No.: US 9,473,414 B2
(45) Date of Patent: Oct. 18, 2016

(54) METHOD AND SYSTEM FOR SUPPORTING PACKET PRIORITIZATION AT A DATA NETWORK

(71) Applicant: Telefonaktiebolaget L M Ericsson (publ), Stockholm (SE)

(72) Inventor: Prashant Anand, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 255 days.

(21) Appl. No.: 14/174,380

(22) Filed: Feb. 6, 2014

(65) Prior Publication Data

US 2015/0222550 A1    Aug. 6, 2015

(51) Int. Cl.
*H04L 12/851* (2013.01)
*H04L 12/26* (2006.01)
*H04L 12/875* (2013.01)
*H04L 12/801* (2013.01)

(52) U.S. Cl.
CPC ........... *H04L 47/24* (2013.01); *H04L 43/0876* (2013.01); *H04L 47/11* (2013.01); *H04L 47/56* (2013.01)

(58) Field of Classification Search
CPC ....................................................... H04L 47/24
See application file for complete search history.

(56) References Cited

U.S. PATENT DOCUMENTS

| | | | | |
|---|---|---|---|---|
| 8,762,501 B2* | 6/2014 | Kempf | ................ | H04L 12/4633 709/220 |
| 2009/0113069 A1* | 4/2009 | Prabhakar | .......... | H04L 43/0882 709/235 |
| 2010/0208752 A1* | 8/2010 | Julien | ................. | H04L 12/6418 370/476 |
| 2012/0051216 A1 | 3/2012 | Zhang et al. | | |
| 2012/0173759 A1* | 7/2012 | Agarwal | ............. | H04L 67/2814 709/241 |
| 2013/0077554 A1* | 3/2013 | Gauvreau | ............... | H04L 5/001 370/312 |
| 2013/0230047 A1* | 9/2013 | Subrahmaniam | ... | H04L 47/2441 370/392 |

FOREIGN PATENT DOCUMENTS

EP      2 282 458 A1      2/2011

OTHER PUBLICATIONS

International Search Report and Written Opinion for Application No. PCT/IB2015/050661, mailed Apr. 13, 2015, 9 pages.
"Draft Standard for Local and Metropolitan Area Networks—Virtual Bridged Local Area Networks—Amendment: Congestion Notification", IEEE P802.1Qau/D2.4, Oct. 28, 2009, 119 pages.
"OpenFlow Switch Specification", Version 1.4.0 (Wire Protocol 0x05), Oct. 14, 2013, 205 pages.
"OpenFlow Switch Specification," Sep. 6, 2012, 128 pages, Version 1.3.1 (Wire Protocol 0x04), Open Networking Foundation.

* cited by examiner

*Primary Examiner* — Dang Ton
*Assistant Examiner* — Nourali Mansoury
(74) *Attorney, Agent, or Firm* — Patent Portfolio Builders, PLLC

(57) ABSTRACT

A method of packet prioritization at a data network is disclosed. The data network contains a number of data plane nodes carrying user traffic and a control node managing the data plane nodes. The method starts with receiving a packet at a data plane node. The data plane node determines that it needs help from the control node for processing the received packet. It then quantizes a congestion level at the data plane node and encoding the quantized congestion level in the packet, where a number of bits in the packet indicates the quantized congestion level. It sends a portion of the packet from the data plane node to the control node, where the portion of the packet includes the number of bits encoding the quantized congestion level.

20 Claims, 7 Drawing Sheets

```
struct ofp_packet_in {
    structure ofp_header header;
    unit32_t  buffer_id;  /* id assigned by data plane node */
    unit16_t  total_len;  /* length of frame */
    unit8_t   reason;     /* reason packet is being sent (one of OFPR_*) */
    unit8_t   table_id;   /* ID of the table that was looked up */
    unit64_t  cookie;     /* Cookie of the flow entry that was looked up */
    structure ofp_match match;  /* Packet metadata. Variable size. */
    /* followed by packet data */
};
```

OpenFlow Packet-in
Message Format 450

FIG. 4A

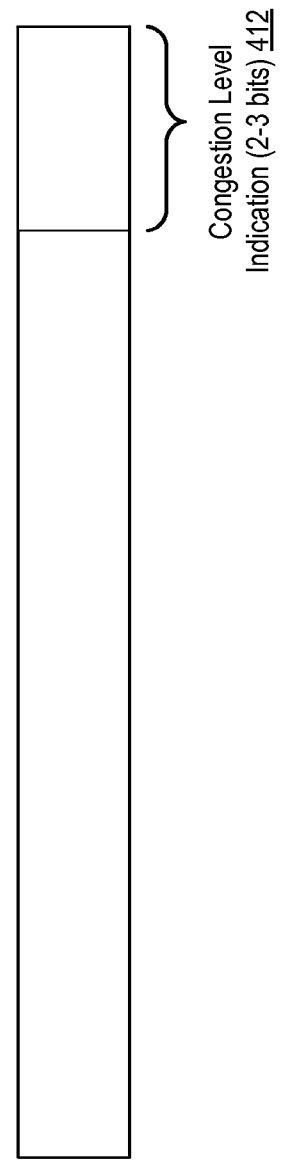

Buffer ID (32 bits) 402

Congestion Level Indication (2-3 bits) 412

FIG. 4B

METHOD AND SYSTEM FOR SUPPORTING PACKET PRIORITIZATION AT A DATA NETWORK

FIELD OF INVENTION

The embodiments of the invention are related to the field of networking. More specifically, the embodiments of the invention relate to a method and system for supporting packet prioritization at a network implemented using Software Defined Networking (SDN) or network functions virtualization (NFV).

BACKGROUND

In a traditional data network, the functions relating to forwarding traffic and determining where to send traffic is done by a single network device. The single network device is commonly said to contain a control plane and a data plane. The traditional integrated approach of the control plane and the data plane being tightly coupled in a single box may result in an overly complicated control plane and complex network management. Due to high complexity, equipment vendors and network operators are often reluctant to initiate changes and the network itself can become fragile and hard to manage over time. This is known to create a large burden and high barrier to new protocol and technology developments.

Software Defined Networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

FIG. 1 illustrates a common SDN architecture. At the bottom of the SDN architecture is the infrastructure layer 102, which contains one or more network devices 112-118. Network devices in a SDN network are often referred to as data plane nodes or forwarding elements. When the SDN network complies with a protocol known as OpenFlow (OF), defined by the Open Network Foundation (ONF), a data plane node is referred to as an OpenFlow (OF) switch or simply switch. For this specification, the term "data plane node," "forwarding element", "OF switch" mean network devices in infrastructure layer 102 for traffic forwarding. Note several versions of OpenFlow standards have been proposed, including a standard dated Oct. 14, 2013, entitled "OpenFlow Switch Specification, version 1.4.0," which is incorporated by reference in its entirety.

The middle layer of the SDN architecture is the control layer 104. Control layer 104 contains SDN control software 122. Control layer 104 is generally implemented in a SDN controller and it contains centralized intelligence of the SDN network. Instead of hand-coding configurations scattered among thousands of devices, a network operator may configure the SDN controller using SDN control software to deploy new applications and change network behavior in real-time. By centralizing network state in the control layer, the SDN architecture gives a network operator the flexibility to configure, manage, secure, and optimize network resources through managing the SDN controller. In addition, the network operator may change SDN control software for her specific need without relying on a vendor of the underlying network devices 112-118 to change its proprietary software.

The upper layer of the SDN architecture is service layer 106. Service layer 106 may interface with control layer 104 via a set of application programming interfaces (APIs). Service layer 106 contains virtual services 132-134 that may be implemented in the SDN network. The virtual services include routing, multicast, security, access, control, bandwidth management, traffic engineering, quality of service, processor and storage optimization, energy use, and all forms of policy management. Thus, a service provider may provide virtual services to a SDN network without being tied to the details of implementation in SDN software and/or network devices. With the abstraction of service layer, the service provider may provide unified services across networks with different implements by different vendors.

Besides SDN, another emerging networking trend is Network Function Virtualization (NFV). NFV leverages standard IT virtualization technology to consolidate many network equipment types onto industrial standard high volume servers, switches, and storage, which could be located in datacenters, network nodes, and in the end user premises. Network function then can be implemented in software, running on a range of industrial standard hardware devices, which can be moved to, or instantiated in, various locations in the network as required. NFV can be implemented using SDN, where the network functions are implemented in the server layer (such as server layer 106 in FIG. 1), and the industrial standard hardware devices are implemented in the SDN control layer and the infrastructure layer.

Within the layered structure of SDN or layered implementation of NFV, a control layer such as SDN control layer 104 plays a central role to manage traffic forwarding and also provide the virtual services to the underlying data plane nodes. Hardware in the control layer such as SDN controller in control layer 104 needs to interact with a number of network devices in infrastructure layer 102, and how to make the control layer 104 intelligently prioritize traffic between control layer 104 and infrastructure layer 102 so that network devices in infrastructure may efficiently forward packet is a challenge.

SUMMARY

A method of packet prioritization at a data network is disclosed. The data network contains a number of data plane nodes carrying user traffic and a control node managing the data plane nodes. The method starts with receiving a packet at a data plane node. The data plane node determines that it needs help from the control node for processing the received packet. It then quantizes a congestion level at the data plane node and encoding the quantized congestion level in the packet, where a number of bits in the packet indicates the quantized congestion level. It sends a portion of the packet from the data plane node to the control node, where the portion of the packet includes the number of bits encoding the quantized congestion level.

A network device for packet prioritization implemented at a data network is disclosed. The data network contains a number of data plane nodes carrying user traffic and a control node managing the data plane nodes. The network device contains ports configured to receive packets. It also contains a set of one or more memory configured to store code and a set of one or more processors configured to execute the code, the execution includes determining that network device needs help from the control node for processing a received packet; quantizing a congestion level at the network device; encoding the quantized congestion level in the packet, where a number of bits in the packet indicates the quantized congestion level; and sending a portion of the packet from the network device to the control node, where the portion of the packet includes the number of bits encoding the quantized congestion level.

A non-transitory machine-readable storage medium is disclosed. The non-transitory machine-readable storage medium has instructions stored therein, which when executed by a processor, causes the process to perform operations implemented at a data plane node of a data network, wherein the data network contains a number of data plane nodes carrying user traffic and a control node managing the number of data plane nodes. The operations includes: receiving a packet at the data plane node, determining that data plane node needs help from the control node for processing a received packet; quantizing a congestion level at the data plane node; encoding the quantized congestion level in the packet, where a number of bits in the packet indicates the quantized congestion level; and sending a portion of the packet from the data plane node to the control node, where the portion of the packet includes the number of bits encoding the quantized congestion level.

Embodiments of the invention aims at prioritizing packets sending from data plane nodes to a control node so that packets from the data plane nodes indicating congestion levels at the data plane nodes. With prioritization indicated in the packets sent from the data plane nodes to the control node, the control node may process packet from data plane nodes according to priority thus make data plane nodes more efficient in forwarding traffic.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 4A illustrates an OpenFlow packet-in message according to one embodiment of the invention.

FIG. 4B illustrates a buffer identifier (ID) of an OpenFlow packet-in message according to one embodiment of the invention.

DETAILED DESCRIPTION

Figure 1:
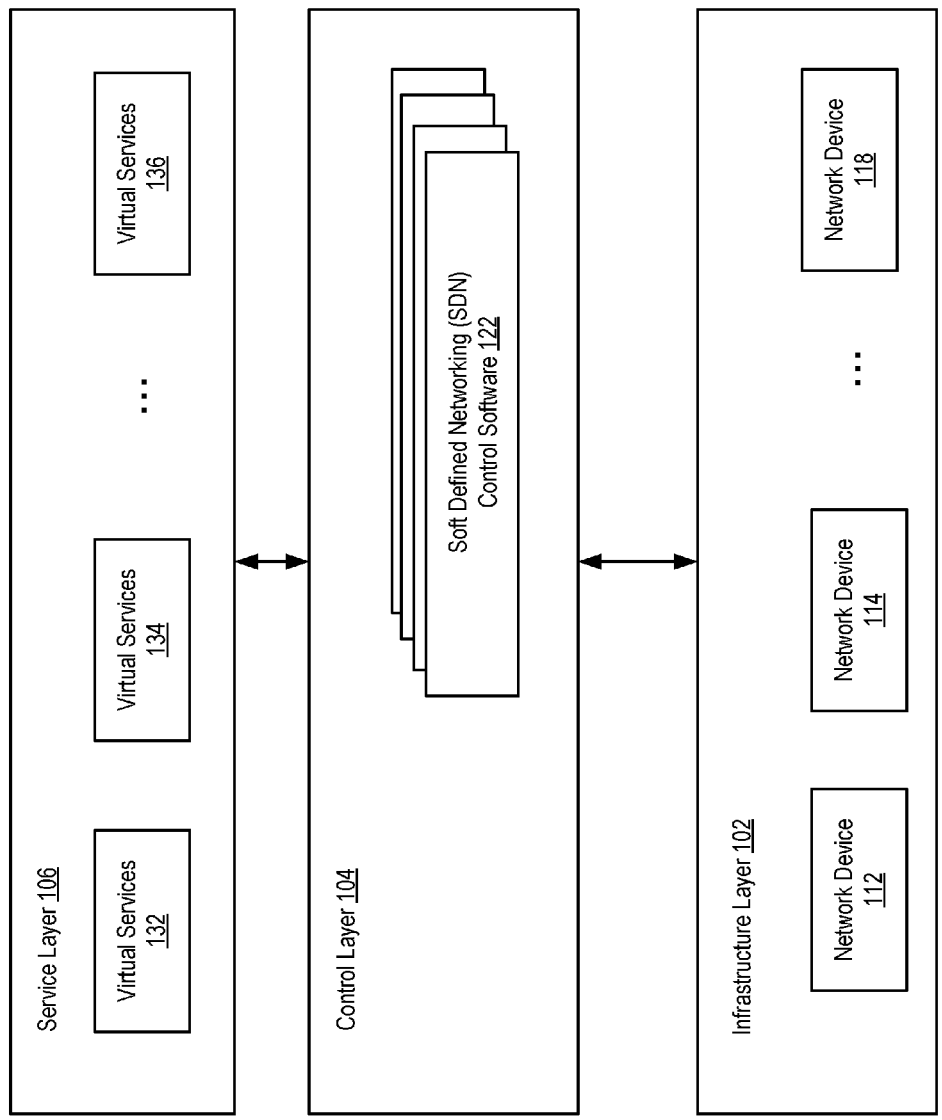
FIG. 1 illustrates a common SDN architecture.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, a switch, or a controller) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). A network device is generally identified by its media access (MAC) address, Internet protocol (IP) address/subnet, network sockets/ports, and/or upper OSI layer identifiers.

Note while the illustrated examples in the specification discuss mainly on SDN system, embodiments of the invention may be implemented in non-SDN system. It can be implemented in a layered network architecture such as a Network Function Virtualization (NFV) architecture. Unless specified otherwise, the embodiments of the invention apply to a control node of a layered network architecture, i.e., they are NOT limited to SDN controller.

Interaction of SDN Controller and Data Plane Nodes

As discussed herein, a SDN controller handles the intelligent actions relating to data plane node traffic forwarding such as topology discovery, link monitoring, traffic steering, and path setup in a SDN network. The SDN controller may be built using commercial off-the-shelf (COTS) hardware with software. For example, the SDN controller may be built using COTS computer servers. The SDN controller may prioritize packets received from a number of data plane nodes so that higher priority packets are processed earlier than lower priority packets.

Figure 2:
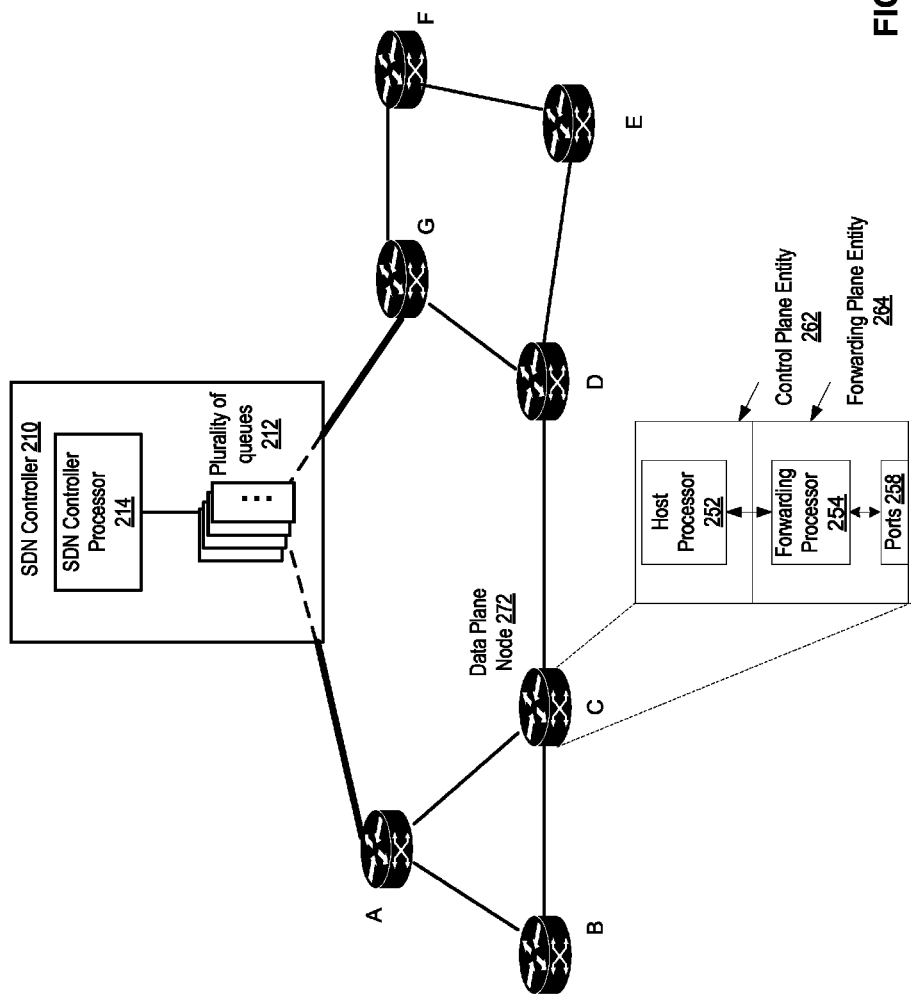
FIG. 2 illustrates a SDN system through which packet prioritization may be implemented according to one embodiment of the invention.

FIG. 2 illustrates a SDN system through which packet prioritization may be implemented according to one embodiment of the invention. The SDN system 200 contains a number of data plane nodes A-G and SDN controller 210. Data plane nodes A-G and SDN controller 210 may be implemented in compliance with a SDN standard such as the OpenFlow standards. While only SDN controller 210 is illustrated, one or more additional SDN controllers may manage data plane nodes A-G.

The main task of data plane nodes A-G is to forward packets within the data plane nodes from an ingress port to an egress port, according to the rules in flow tables programmed by the one or more SDN controllers. Each flow entry contains a set of actions such as forwarding packets to a given port, modifying certain bits in a packet header, encapsulating packets to the network controller, or dropping the packets. For the first packet in a new flow, the forwarding element often forwards the packet to the network controller to trigger the new flow being programmed and new dynamic next-hop route being set. It can also be used to forward slow-path packets such as Internet Control Message Protocol (ICMP) packets to the SDN controllers for processing. Note that the concept of a flow can be defined broadly, e.g., a TCP connection, or all traffic from a particular MAC address or IP address. Also note that a packet within network 200 is defined broadly and it may be an Ethernet frame, an IP network packet, or a message in a proprietary format.

In one embodiment, data plane node can be viewed logically as containing two main components. One is a control plane entity and the other is a forwarding plane (or data plane plane) entity. A zoom-in view of data plane node C at reference 272 illustrates the two plane entities. Data plane node C contains control plane entity 262 and forwarding plane entity 264. Control plane entity 262 coordinates management and configuration of data plane node C. Configuration of forwarding plane entity 264 is achieved by running applications on host processor 252. Host processor 252 usually runs an operating system in order to provide a well-known development environment. Commands from host processor 252 are sent to forwarding processor 254 using an interconnect (e.g., a peripheral component interconnect (PCI) bus). Exception packets (e.g., packet for routing and management) are often processed on host processor 252. Forwarding processor 254 interacts with various forwarding ports 258 of data plane node C to forward and otherwise process incoming and outgoing packets.

Forwarding plane entity 264 is responsible for forwarding traffic (e.g., forwarding operations includes switching, routing, and learning). It contains forwarding processor 254 that is designed to provide high throughput at the detriment of a more complex and flexible development environment. Different types of high performance memory and hardware accelerator are often found on board of forwarding processor 254 for achieving the high throughput. In contrast, host processor 252 can be more complex and flexible at the detriment of providing high throughput as it processes more control packets (often referred to as slow path packets) than data packet thus throughput is less mission critical. When data plane node C receives a packet associated with a new flow, it does not know where to forward the packet. Thus it sends the packet to its managing SDN controller (SDN controller 210 in this example).

SDN controller 210 receives the packet. The packet is stored in a number of priority queues at reference 212. The packet is then processed by SDN controller processor 214 according to a priority order in processing packets in the priority queues. SDN controller processor 214 programs a new flow entry based on its associated prefix and dynamic next-hop. It then sends the new flow entry to data plane node C. Data plane node C then forwards the packet according to the new flow entry.

SDN controller 210 adds and removes flow-entries from a flow table. It defines the interconnection and routing among a set of data plane nodes and other network devices. It also handles network state distribution, such as collecting information from the set of data plane nodes and distributing forwarding/routing instructions to them. SDN controller 210 can also be programmed to support new addressing, routing, and complex packet processing applications. A data plane node needs to be coupled to and managed by at least one SDN controller to function correctly. A SDN controller generally manages multiple data plane nodes, and it processes packets from the multiple data plane nodes according to the priority order in the priority queues.

Embodiments of Supporting Packet Prioritization at a SDN System

Figure 3:
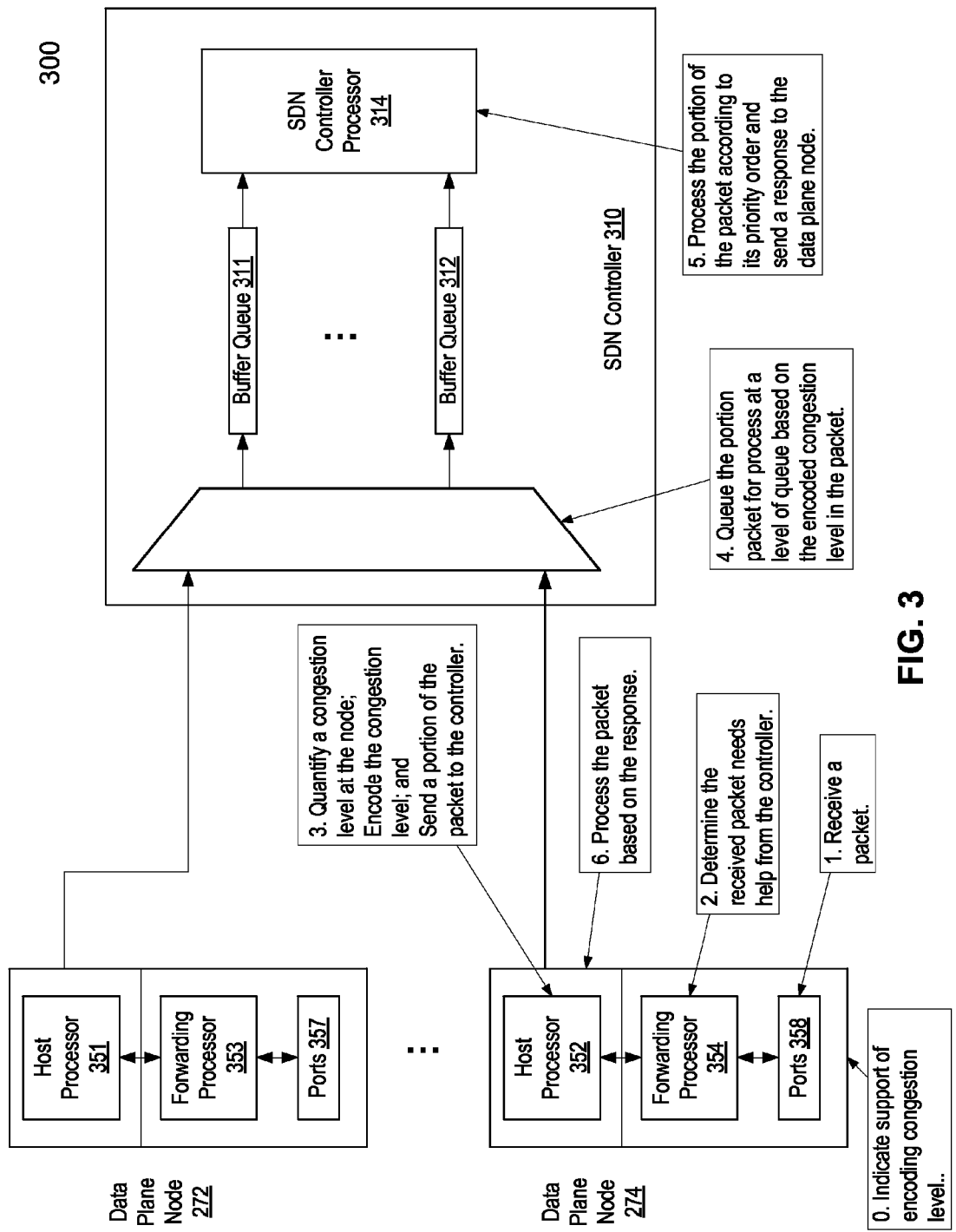
FIG. 3 illustrates supporting prioritization at a SDN system according to one embodiment of the invention.

FIG. 3 illustrates supporting prioritization at a SDN system according to one embodiment of the invention. The SDN system 300 contains SDN controller 310 and data plane nodes 272 and 274. While only two data plane nodes are illustrated, many more data plane nodes may be connected to SDN controller 310. Note that SDN controller 310 and data plane nodes 272/274 contain other components not shown as they are not essential for understanding the invention, such as memory storing software enabling operations at SDN controller 310 and data plane nodes 272/274. Task boxes 0-6 illustrate the order in which operations are performed according to one embodiment of the invention. While the task boxes illustrate only operations between SDN controller 310 and data plane node 274, operations between SDN controller 310 and other data plane nodes are similar. Note while the embodiments of supporting packet prioritization are illustrated using a SDN system, the principle of the embodiments of the invention applies to other layered network architecture.

In SDN system 300, the support of prioritization is through encoding and decoding congestion levels at the data plane node. Generally speaking, a data plane node encodes a packet with an indication of the congestion level at the data plane prior to sending a portion of the packet (or full packet in some embodiment) to the controller. The controller decodes the received portion of the packet and queues it according to the congestion level so that packets from nodes with a higher congestion level may be processed in a higher priority than packets from nodes with a lower congestion level.

Referring to FIG. 3, at task box 0, data plane node 274 indicates its support of encoding congestion levels. In one embodiment, the indication is given to SDN controller 310 at registration of data plane node 274 at SDN controller 310. In an alternate embodiment, the indication is given to SDN controller 310 prior to the data plane node being about to send a packet to SDN controller 310. Note the SDN controller and at least one data plane node need to support coding of congestion levels, and encoding/decoding of congestion level need to synchronization between the SDN controller and the at least one data plane node.

Task box 0 is an optional step and in some SDN system it is not needed. For example, SDN system 300 may support encoding congestion level by default, in which case data plane node 274 does not need to individually indicate its support of encoding congestion level. Furthermore, there are other ways for the SDN controller and data plane nodes to communicate the support of encoding/decoding congest level, such as:
- Through capacity negotiation between the SDN controller and data plane nodes. The capacity negotiation can be implemented as a well-known handshake protocol between the SDN controller and data plane nodes, where the two sides agree to support encoding congestion level.
- Through a vendor extension added to packets from the data plane nodes to the SDN controller. Vendor extension can be added to packets and still comply with standard such as OpenFlow standard such as OpenFlow Switch Specification 1.4.0. Vendor extension may be used to indicate the support of encoding congestion level at a data plane node.
- Through sending packets on specific ports (e.g., TCP port) of the data plane nodes to the SDN controller. The specific ports are allocated for the data plane nodes supporting encoding congestion level, and the port allocation may be performed by a network management function of the SDN system.

At task box 1, data plane node 274 receives a packet. As discussed herein above, a data plane node may or may not need help from a SDN controller to forward a packet to another data plane node. If the data plane node does not need help from the SDN controller to forward the packet, the data plane node forwards the packet away to another data plane node through an egress port. Alternatively, at task box 2, the data plane node determines that it needs help from SDN controller 310 for processing, so that a new flow is programmed and new dynamic next-hop route can be set. In one embodiment, the determination is made by forwarding processor 354.

Once it is determined that the data plane node needs help from SDN controller 310, at task box 3, data plane node 274 quantizes a congestion level at the node. The detail of quantizing the congestion level will be discussed in more details herein below. The congestion at the data plane node may be quantized into a number of levels, (e.g., 2, 4, 8, or 16 levels). The ranges of levels are preferably in power of two so that the levels can be represented by binary bits of the packet (e.g., 1, 2, 3, or 4 bits respectively), although other ranges of levels may be implemented applying the principle disclosed in the specification. The quantized congestion level is encoded to bits and add to the packet (e.g., adding to the header of the packet).

In one embodiment, the packet with the added bits indicating the quantized congestion level is then saved at a buffer (sometimes referred to as a buffer pool) of the data plane node, and a portion of the packet is sent to SDN controller 310 according to priority orders of packets within the buffer. In an alternative embodiment, the full packet including the quantized congestion level is sent to SDN controller 310. Also, instead of storing the packet with the added bits indicating the quantized congestion level at the buffer, the full packet may be sent right away to SDN controller 310. Note that when only a portion of the packet is sent to SDN controller 310, the portion needs to be large enough for the SDN controller to uniquely identify the packets from all other packets sent to the SDN controller. In one embodiment, the portion of the packet is 128 bytes long. Also, the full packet or the portion of the packet includes an identifier uniquely identifies the packet at the SDN controller 310. In one embodiment, the identifier is a buffer identifier (ID) as discussed herein below in detail.

At task box 4, the portion of the packet is received at SDN controller 310, along with all other packets received at SDN controller 310. SDN controller 310 will examine the quantized congestion level of the portion of the packet. The portion of the packet is then queued at one of the buffer queues within SDN controller 310 based on the encoded quantized congestion level of the portion of the packet. SDN controller 310 may contain a number of buffer queues such as buffer queues 311 and 312 illustrated in FIG. 3. Note the queuing within SDN controller 310 may be implemented logically without being physically separated into multiple queues. Persons in the ordinary skill of the art understand that there are a variety of ways to implement prioritized queues in the SDN controller 310.

At task box 5, SDN controller processor 314 of SDN controller processes the portion of the packet according to the priority order of the portion of the packet. The priority order may be determined based on the priority order of the buffer queues and also the priority order of packets within a given buffer queue. The SDN controller processor 314 generates a response for the portion of the packet after processing, and the response includes an identifier uniquely identifying the portion of the packet for which the response is generated. Then the response is returned to data plane node 274 from which the portion of the packet is received.

At task box 6, the data plane node matches the response from the SDN controller with the packet waiting to be processed and processes the packet accordingly. The matching is through matching the identifier (e.g., buffer ID) in one embodiment.

Through the process, the congestion level at the data plane node is encoded in the packet (or a portion of the packet) sent to the SDN controller, and SDN controller may process the packet according to its priority. Thus, the SDN controller may prioritize the received packets and process the packet from a data plane node with more congestions first so that the SDN controller may return a response to the data plane node quicker. As the data plane node receives the response from the SDN controller sooner than otherwise, the congestion level at the data plane node is likely lessened than otherwise.

In contrast, without the prioritization, when the congestion reaches a certain level (e.g., the buffer at the data plane node is full), a data plane node may either drop the packets waiting to be processed or send the packets waiting to be processed to the control node. In the former, the direct drop of packet reduces the quality of service the SDN system offers. In the latter, the data plane node moves the burden of congestion from the data plane node to the control node and network connections between the data plane node and the control node, even if the control node may be more powerful in resolving the congestion, it is not a scalable solution. Utilizing embodiments of this invention, the prioritization of packets through the process controls the congestion level at the data plane nodes through communicating the congestion level at the data plane nodes to the control node, which then prioritizes its processing of packets accordingly, and the congestion of the whole network may be alleviated as a result.

Packets with Quantized Congestion Level Indication

The packets sent from a data plane node to a control node discussed herein are referred by many names, such as exception packet and punted packet. In one embodiment, the packets is in a format of packet-in message as specified in a standard dated Oct. 14, 2013, entitled "OpenFlow Switch Specification, version 1.4.0." In all embodiments, the packets may be added with a quantized congestion level indication discussed herein above. FIG. 4A illustrates an OpenFlow packet-in message according to one embodiment of the invention. The packet-in message is for packets sent from a data plane node to a control node (s referred to as packets received on port from data path to controller).

The packet is referred to as ofp_packet_in (ofp is short for OpenFlow packet), and it contains a structure for header (i.e., ofp_header) and packet metadata. The definition of various fields are defined in the standard, which is incorporated by reference in its entirety and it is not repeated here. Within the header, the buffer identifier (ID) is particularly germane to the embodiments of the invention. The buffer ID is an opaque value used by the data plane node (referred to as datapath in the standard) to identify a buffered packet. When the packet is buffered in waiting for guidance of the control node, a portion of the packet is sent to the control node and the portion of the packet includes the buffer ID as illustrated in FIG. 4A. In one embodiment, the portion of the packet is 128 bytes, but the portion of the packet can be shorter or longer and in one embodiment, the full packet is sent in a packet-in message. Note the buffer ID may be referred to as cookie identifier (ID) in an alternate packet format.

FIG. 4B illustrates a buffer identifier (ID) of an OpenFlow packet-in message according to one embodiment of the invention. The buffer ID contains 32 bits, and it contains a value assigned by the data plane node, which may encode a congestion level to the buffer ID. In one embodiment, the last bits of the buffer ID is used to indicate a quantized congestion level. Preferably, the last two or three bits are used for the purpose, in which case the buffer ID indicates four or eight congestion level respectively. Obviously, other locations within the buffer ID and other length of bits for congestion indication are viable.

Quantization of Congestion Levels

Congestion levels may be used to indicate different types of congestion. In one embodiment, the indicated congestion corresponds to a status of one or more packets at a data plane node waiting for responses from a control node, where the responses guide the data plane node to forward the packets to other data plane nodes. The more packets are waiting for responses in the buffer of the data plane node, the more congested the data plane node is. Congestion levels may also be quantized in a variety of ways. One may quantized congestion level in comply with IEEE 802.1au standard, such as IEEE P802.1Qau/D2.4, dated Oct. 28, 2009, and entitled "Draft Standard for Local and Metropolitan Area Networks—Virtual Bridged Local Area Networks—Amendment: Congestion Notification," which is incorporated by reference in its entirety.

In one embodiment, an equilibrium threshold is defined, and it is the operating point of a buffer occupancy under congestion conditions, and it may be referred as buffer_occupancy_eq. Buffer_occupancy_eq is the target level around which the buffer occupancy should oscillate under normal congestion condition. A congestion qualifier module (illustrated in FIG. 7 and discussed in more details herein below) may compute a congestion measure, a feedback value, Fb. If Fb is negative, it indicates that congestion is ongoing. Fb may be formulated as:

$$Fb=-(buffer\_off+w*buffer\_delta)$$

Where buffer_off=buffer_occupancy_instant−buffer_occupancy_eq, buffer_delta=buffer_occupancy_instant−buffer_occupancy_old, and W=low pass filter constant While buffer_occupancy_eq is the target level around which the buffer occupancy should oscillate, buffer_occupancy_instant is the level at which the buffer occupancy is at a given moment. The difference of the two, buffer offset (denoted as buffer_off), measures the absolute value of buffer excess (how many packets are in the buffer). In contrast, a relative value of buffer excess, a rate of change of buffer occupancy, is denoted as buffer_delta, which measures the difference between buffer occupancy at the given moment and an earlier moment (how quickly packets are removed from the buffer). W is a law pass filter constant that a system may choose depend on implementation.

Thus Fb captures a combination of buffer size and buffer change rate. It factors in three congestion components: buffer's egress bandwidth (the size of the buffer and how many packets it can accommodate), buffer's deviation from its equilibrium, and buffer's accumulation rate. When Fb is negative, the buffer is oversubscribed and indicates an impending congestion. The more negative the value of Fb, the greater the degree of congestion level. The value of Fb then in turn is quantized using bits in the portion of packets sent from the data plane nodes to the control node through known methods. The mapping of Fb values to the bit values of the packet may be proportional, i.e., the range of Fb values is divided in equal intervals and each interval corresponds to a bit value. It may also be another distribution suitable to observed Fb pattern, where certain ranges of Fb are given more bits to quantize while others less bits. The embodiments of the invention may be applied to different mapping of Fb values to the bit values.

Flow Diagrams for Embodiments of Supporting Prioritization

Figure 5:
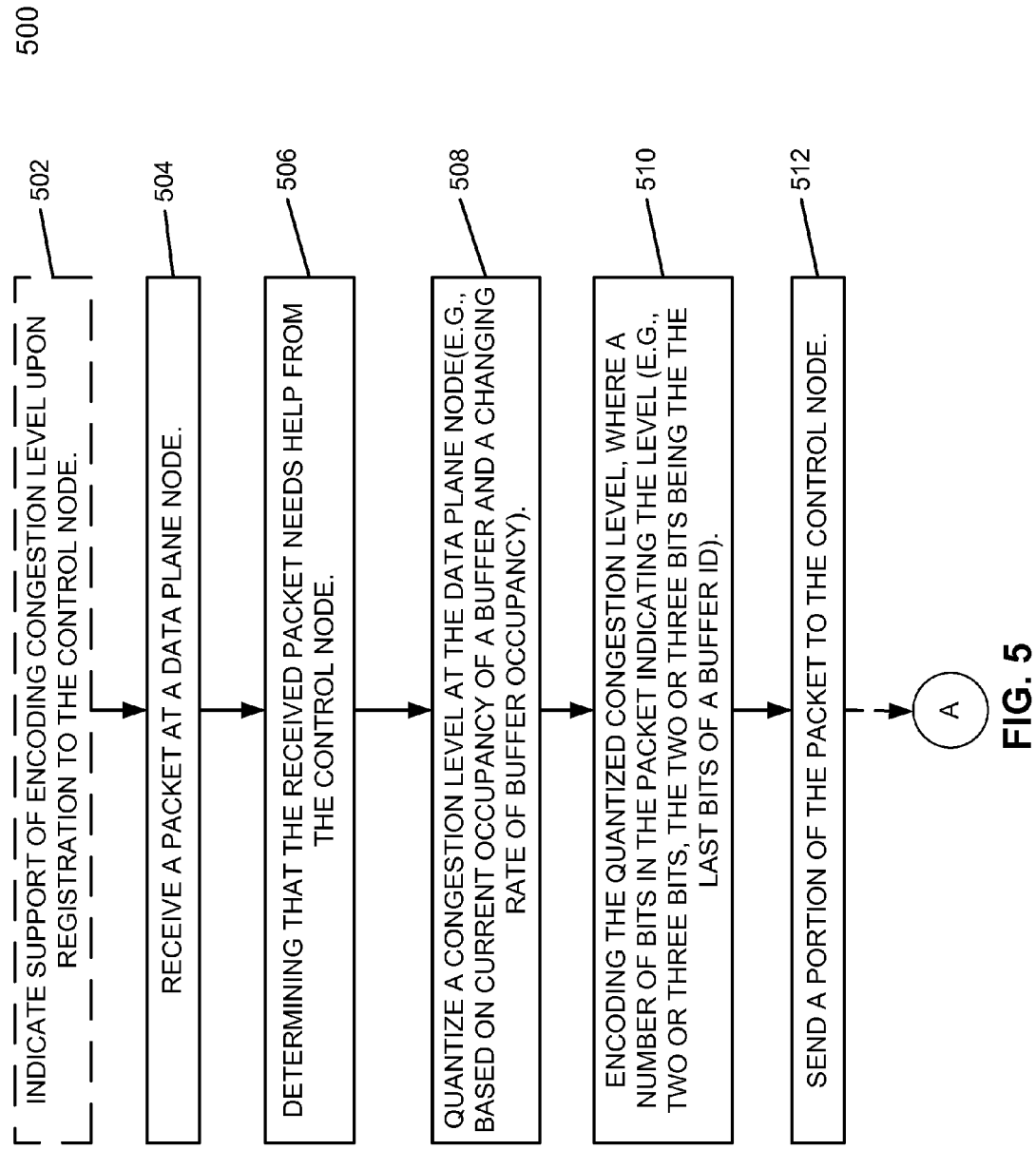
FIG. 5 is a flow diagram illustrating a process of supporting packet prioritization at a data plane node according to one embodiment of the invention.

FIG. 5 is a flow diagram illustrating a process of supporting packet prioritization at a data plane node according to one embodiment of the invention. Method 500 may be implemented at a data plane node of a layered network architecture including one or more control nodes and a number of data plane nodes. In one embodiment, the layered network architecture is a SDN system, and the control node is a SDN controller.

Method 500 may optionally start at reference 502, where the data plane node indicates its support of encoding congestion level upon its registration to a control node. For packet prioritization to work, both the data plane node and the control node need to support coding of congestion level, and such indication of the data plane node at its registration to the control node is one way to communicate. In alternative embodiments, the support of coding of congestion level may be communicated through capacity negotiation between the control node and the data plane node, through a vendor extension added to packets from the data plane node to the control node, or through sending packets on specific port of the data plane to the control node. The details of the options are discussed herein above using examples of communication between the data plane node and the SDN controller.

At reference 504, the data plane node receives a packet. It then determines whether or not it needs help from the control node for processing the received packet. If the packet does not need help from the control node, the data plane node processes the packet by itself. At reference 506, the data plane node determines that it needs help from the control node for processing the received packet.

At reference 508, the data plane node quantizes a congestion level at the data plane node. In one embodiment, the congestion level corresponds to a status of one or more packets waiting for response from the control node. In one embodiment, the congestion level is quantized by computing a congestion measure that is based on current occupancy of a buffer of the data plane and a changing rate of buffer occupancy of the buffer.

At reference 510, the data plane encodes the quantized congestion level in the packet, where a number of bits within the packet indicating the quantized congestion level. The number of bits may be one or more bits (such as two to three bits). The packet may take the format of a packet-in message defined in the OpenFlow standard for SDN systems, and the quantized congestion level is stored in bits of the buffer identifier, for example, the last two or three bits.

At reference 512, a portion of the packet is sent to the control node, and the portion of packet includes the number of bits encoding the quantized congestion level.

Figure 6:
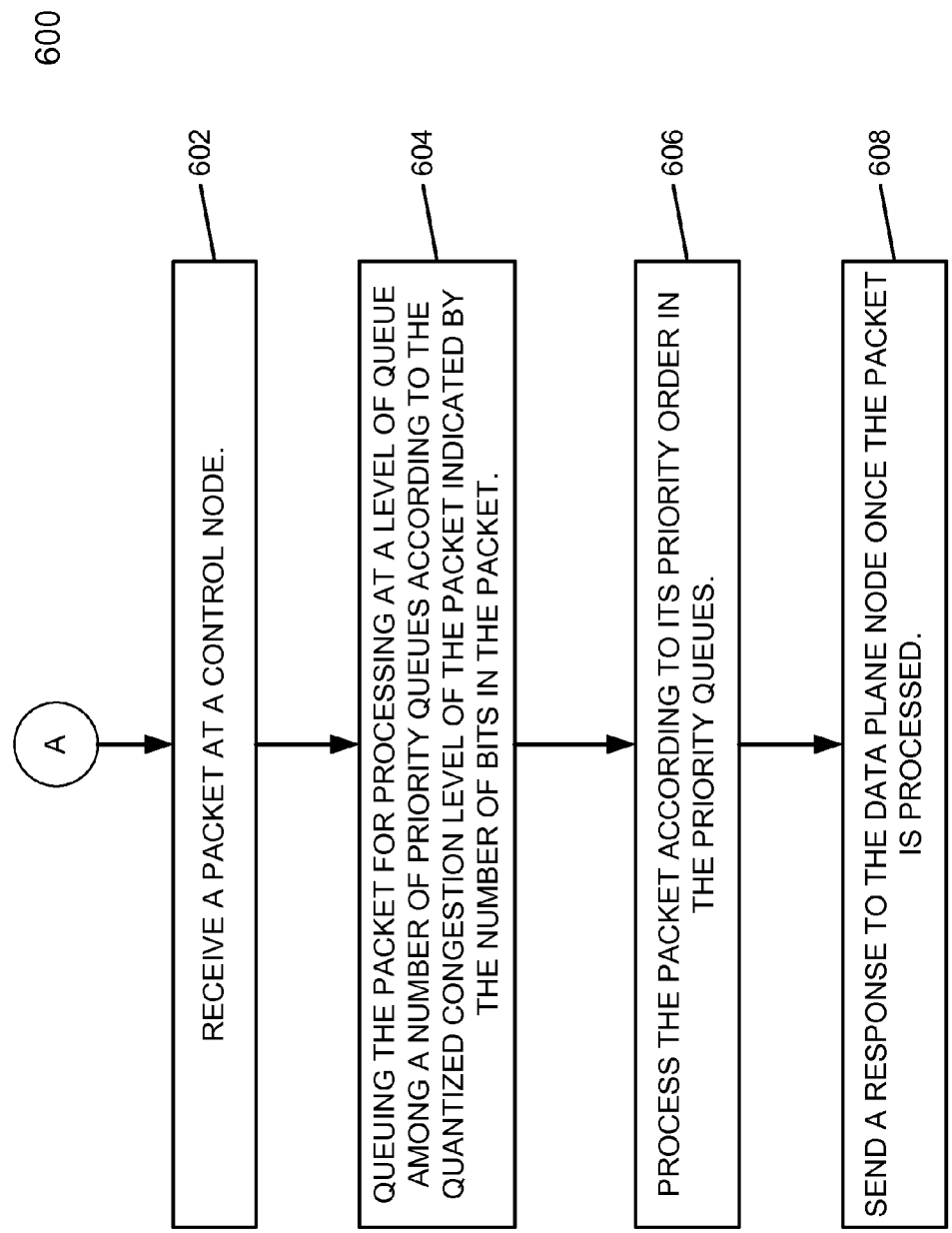
FIG. 6 is a flow diagram illustrating a process of supporting packet prioritization at a control node according to one embodiment of the invention.

FIG. 6 is a flow diagram illustrating a process of supporting packet prioritization at a control node according to one embodiment of the invention. Method 600 may be implemented at a control node of a layered network architecture including one or more control nodes and a number of data plane nodes. In one embodiment, the layered network architecture is a SDN system, and the control node is a SDN controller.

Method 600 starts with reference 602, where a packet is received at the control node. The received packet may be the portion of the packet with the number of bits encoding the quantized congestion level, where the encoding is performed by method illustrated in FIG. 5. The received packet may be a full packet or a portion of a packet with a number of bits encoding a quantized congestion level in a different way.

At reference 604, the control node queues the packet for processing at a level of queue among a number of priority queues at the control node according to the quantized congestion level of the packet indicated by the number of bits in the packet. Note the number of priority queue may be implemented logically without being physically separated into multiple queues. Not only the level of queue is determined by the quantized congestion level of the packet indicated by the number of bits in the packet, but also the relative location within the queue of the packet is also determined by the quantized congestion level according to one embodiment.

At reference 606, the control node processes the packet according to its priority order in the number of priority queues. Note its priority order is based on not only the priority among the number of priority queues, but also its relative location within the queue according to one embodiment of the invention.

At reference 608, the control node sends a response to the data plane node from where the packet is received once the packet is processed. Note the response includes an identifier identifying the packet for which the response is for so that a data plane node receiving the packet will be able to determine whether the packet is for itself and for which packet the response is sent.

Network Devices Implementing Method of Packet Prioritization

Figure 7:
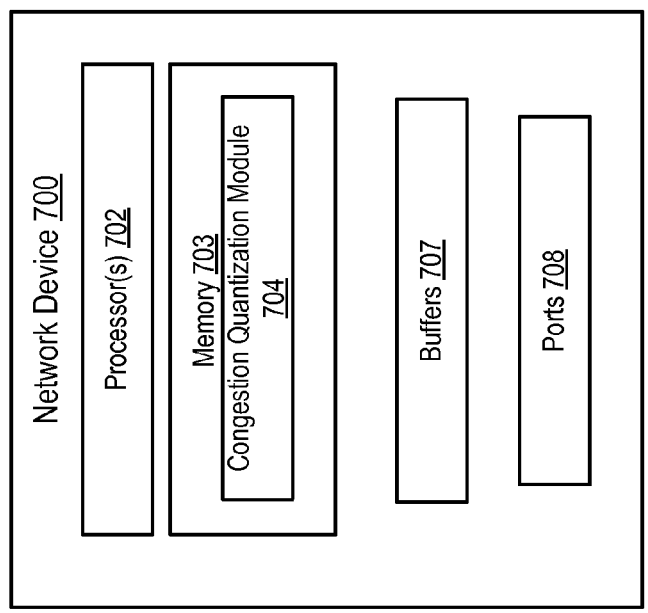
FIG. 7 is a block diagram illustrating a network device implementing a method of packet prioritization according to one embodiment of the invention.

FIG. 7 is a block diagram illustrating a network device implementing a method of packet prioritization according to one embodiment of the invention. The network device is coupled to a data network (such as a SDN network or a layered network architecture implementing NFV), where the data network contains a number of data plane nodes, which carry user traffic, and one or more control nodes managing the data plane nodes. The network device serves as a data plane node of the data network.

Network device 700 contains processor(s) 702, memory 703, buffers 707 and ports 708. The processors can be a general purpose or special purpose processors and the modules may be implemented as a single unit. In alternative embodiment, the processors may be separated as host processors and forwarding processors as illustrated in FIG. 2. Memory 703 one of a variety of memory types. Memory 703 contains a congestion quantization module 704, which contains the code to be executed by processors 702. Buffers 707 are the buffers to store packets waiting to be processed at the network device. In one embodiment, the packets are the ones waiting for response from the one or more control nodes. Ports 708 contain physical ports transmitting and receiving packets, and they are the packet interface of network device 700. Ports 708 may also contain logical ports such as TCP ports.

In one embodiment, the network device optionally indicates its support of encoding congestion level upon the network device's registration to a control node of the data network. In one embodiment, the network device receives a packet, and it determines that it needs help from the control node for processing the received packet. The network device then quantizes a congestion level at the network device. The quantization is performed by computing a congestion measure that is based on current occupancy of a buffer (such as buffers 707) of the network device and a changing rate of buffer occupancy of the buffer in one embodiment.

Then the network device encodes the quantized congestion level in the packet, where a number of bits in the packet indicates the quantized congestion level. In one embodiment, the number of bits is either two or three bits. The packet uses a packet-in message format defined in the OpenFlow standard in one embodiment. The bits for quantizing the congestion level is encoded in a buffer identifier (ID) of the packet, for example, the last two or three bits of the buffer ID. After encoding the congestion level, the network device sends a portion of the packet to the control node, including the number of bits encoding the quantized congestion level.

At the control node, after receiving the portion of the packet, it queues the portion of the packet for processing at a level of queue among a number of priority queues at the control node according to the quantized congestion level of the packet indicated by the number of bits in the portion of the packet. It then processes the portion of the packet according to its priority order in the number of priority queues and sends a response to the network device once the portion of the packet is processed. At the network device, after receiving the response, it matches the response to the packet waiting for processing and processing according to the response from the control node.

Note the operations of the flow diagrams in FIGS. 5 and 6 are described with reference to the exemplary embodiment of FIG. 7. However, it should be understood that the operations of flow diagrams can be performed by embodiments of the invention other than those discussed with reference to FIG. 7, and the embodiments discussed with reference to FIG. 7 can perform operations different than those discussed with reference to the flow diagrams of FIGS. 5 and 6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

The techniques shown in the figures can be implemented using code and data stored and executed on one or more electronic devices (e.g., an end system, a network device, or a cloud centralized management system at a data center). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented at a data network, wherein the data network contains a plurality of data plane nodes carrying user traffic and a control node managing the plurality of data plane nodes, the method comprising:

receiving a packet at a data plane node to forward the packet to another data plane node;

determining that the data plane node needs help from the control node for processing the packet to forward the packet, wherein the control node provides the help in order for the data plane node to forward the packet;

quantizing a congestion level encountered at the data plane node;

encoding the quantized congestion level in the packet, wherein a number of bits indicates the quantized congestion level; and sending a portion of the packet from the data plane node to the control node, wherein the portion of the packet includes the number of bits encoding the quantized congestion level and wherein the number of bits encoding the quantized congestion level is for use by the control node to prioritize a priority order for the control node to provide the help to the data plane node for processing the packet and forwarding the packet to the another data plane node.

2. The method of claim 1, further comprising:
receiving the portion of the packet at the control node;
queuing the portion of the packet for processing at a level of priority among a number of priority ordered queues at the control node according to the quantized congestion level of the packet indicated by the number of bits in the portion of the packet sent to the control node;
processing the portion of the packet at the control node according to the level of priority; and
sending a response to the data plane node once the portion of the packet is processed, wherein the response provides the help to the data plane node.

3. The method of claim 1, further comprising:
indicating support of encoding the congestion level of the data plane node upon the data plane node's registration to the control node.

4. The method of claim 1, wherein the packet uses a packet-in message format defined in OpenFlow standard for software defined networking (SDN) systems.

5. The method of claim 1, wherein the congestion level is quantized by computing a congestion measure that is based on:
current occupancy of a buffer of the data plane node; and
a changing rate of the occupancy of the buffer.

6. The method of claim 1, wherein the number of bits indicating the quantized congestion level is two or three bits.

7. The method of claim 1, wherein the bits indicating the quantized congestion level is in a buffer identifier of the packet.

8. The method of claim 7, wherein the bits indicating the quantized congestion level is in last two or three bits of the buffer identifier of the packet.

9. A network device coupled to a data network, wherein the data network contains a plurality of data plane nodes carrying user traffic and a control node managing the plurality of data plane nodes, the network device comprising:
ports configured to receive a packet and forward the packet to another data plane node;
a set of one or more memory configured to store code; and
a set of one or more processors configured to execute the code, which when executed causes the network device to perform in operations at a data plane node to:
determine that the network device needs help from the control node for processing the packet to forward the packet, wherein the control node provides the help in order for the network device to forward the packet;

quantize a congestion level encountered at the network device;

encode the quantized congestion level in the packet, wherein a number of bits indicates the quantized congestion level; and send a portion of the packet from the network device to the control node, wherein the portion of the packet includes the number of bits encoding the quantized congestion level and wherein the number of bits encoding the quantized congestion level is used by the control node to prioritize a priority order for the control node to provide the help to the data plane node for processing the packet and forwarding the packet to the another data plane node.

10. The network device of claim 9, wherein the portion of the packet sent to the control node is for the control node to queue the portion of the packet for processing at a level of priority among a number of priority ordered queues at the control node according to the quantized congest level indicated by the number of bits in the portion of the packet, process the portion of the packet at the control node according to the level of priority, and send a response to the network device once the portion of the packet is processed.

11. The network device of claim 9, wherein the network device is configured to indicate support of encoding the congestion level of the network device upon the network device's registration to the control node.

12. The network device of claim 9, wherein the packet uses a packet-in message format defined in OpenFlow standard for software defined networking (SDN) systems.

13. The network device of claim 9, wherein the congestion level is quantized by computing a congestion measure that is based on:
current occupancy of a buffer of the network device; and
a changing rate of the occupancy of the buffer.

14. The network device of claim 9, wherein the number of bits indicating the quantized congestion level is two or three bits.

15. The network device of claim 9, wherein the bits indicating the quantized congestion level is in a buffer identifier of the packet.

16. The network device of claim 15, wherein the bits indicating the quantized congestion level is in last two or three bits of the buffer identifier of the packet.

17. A non-transitory machine-readable storage medium having instructions stored therein, which when executed by a processor, causes the processor to perform operations implemented at a data plane node of a data network, wherein the data network contains a plurality of data plane nodes carrying user traffic and a control node managing the plurality of data plane nodes, the operations comprising:

receiving a packet at the data plane node to forward the packet to another data plane node;

determining that the data plane node needs help from the control node for processing the packet to forward the packet, wherein the control node provides the help in order for the data plane node to forward the packet;

quantizing a congestion level encountered at the data plane node;

encoding the quantized congestion level in the packet, wherein a number of bits indicating the quantized congestion level; and sending a portion of the packet from the data plane node to the control node, wherein the portion of the packet includes the number of bits encoding the quantized congestion level and wherein the number of bits encoding the quantized congestion level is used by the control node to prioritize a priority order for the control node to provide the help to the data plane node for processing the packet and forwarding the packet to the another data plane node.

18. The non-transitory machine-readable storage medium of claim 17, wherein the congestion level is quantized by computing a congestion measure that is based on:
current occupancy of a buffer of the data plane node; and
a changing rate of the occupancy of the buffer.

19. The non-transitory machine-readable storage medium of claim 17, wherein the bits indicating the quantized congestion level is in a buffer identifier of the packet.

20. The non-transitory machine-readable storage medium of claim 19, wherein the bits indicating the quantized congestion level is in last two or three bits of the buffer identifier of the packet.

* * * * *